United States Patent
St. Pierre

(10) Patent No.: US 10,142,360 B2
(45) Date of Patent: Nov. 27, 2018

(54) SYSTEM AND METHOD FOR ITERATIVELY UPDATING NETWORK ATTACK MITIGATION COUNTERMEASURES

(71) Applicant: Arbor Networks, Inc., Burlington, MA (US)

(72) Inventor: Brian St. Pierre, Acworth, NH (US)

(73) Assignee: Arbor Networks, Inc., Burlington, MA (US)

( * ) Notice: Subject to any disclaimer, the term of this patent is extended or adjusted under 35 U.S.C. 154(b) by 227 days.

(21) Appl. No.: 15/290,754

(22) Filed: Oct. 11, 2016

(65) Prior Publication Data

US 2018/0103058 A1 Apr. 12, 2018

(51) Int. Cl.
*H04L 29/06* (2006.01)

(52) U.S. Cl.
CPC ...... *H04L 63/1425* (2013.01); *H04L 63/1433* (2013.01); *H04L 63/1441* (2013.01); *H04L 63/20* (2013.01)

(58) Field of Classification Search
CPC . H04L 63/20; H04L 63/1441; H04L 63/1425; H04L 63/1433; H04L 63/1416
USPC .......................................................... 726/22
See application file for complete search history.

(56) References Cited

U.S. PATENT DOCUMENTS

| | | | | |
|---|---|---|---|---|
| 7,251,215 B1 * | 7/2007 | Turner | ................ | H04L 12/4633 370/231 |
| 7,970,886 B1 * | 6/2011 | Wetherall | ................ | H04L 41/28 709/224 |
| 8,806,607 B2 * | 8/2014 | Archer | ................ | H04L 63/1416 709/224 |
| 9,438,614 B2 * | 9/2016 | Herz | .................... | G06Q 20/201 |
| 2004/0236963 A1 * | 11/2004 | Danford | ............. | H04L 63/1458 726/24 |
| 2005/0210533 A1 * | 9/2005 | Copeland | ............ | H04L 63/1416 726/23 |
| 2006/0085855 A1 * | 4/2006 | Shin | .................... | H04L 63/1416 726/23 |
| 2006/0150249 A1 * | 7/2006 | Gassen | ................. | G06F 21/554 726/23 |
| 2008/0086776 A1 * | 4/2008 | Tuvell | ................... | G06F 21/564 726/24 |

(Continued)

OTHER PUBLICATIONS

Chung, Chun-Jen, et al. "NICE: Network intrusion detection and countermeasure selection in virtual network systems." IEEE transactions on dependable and secure computing 10.4 (2013): 198-211.*

(Continued)

*Primary Examiner* — Syed A Zaidi
(74) *Attorney, Agent, or Firm* — Locke Lord LLP; Scott D. Wofsy; Christopher J. Capelli

(57) ABSTRACT

A system and computer-implemented method for mitigating a malicious network attack. The method includes receiving an attack alert that a network attack has been detected, saving a sample of captured network traffic in response to the attack alert, playing back the sample while applying a playback countermeasure to the captured network traffic to block sample segments from the sample, analyzing at least one of the blocked sample segments and throughput sample segments that are not blocked, and adjusting the playback countermeasure in response to a result of the analyzing.

20 Claims, 6 Drawing Sheets

(56) References Cited

U.S. PATENT DOCUMENTS

2013/0263259 A1* 10/2013 Huston, III ......... H04L 63/1408
726/22
2014/0325634 A1* 10/2014 Iekel-Johnson ....... H04L 63/101
726/13

OTHER PUBLICATIONS

Tony Scheid, Consulting Engineer, Australia/New Zealand; "DDoS Detection and Mitigation Best Practices"; https://www.ts-x.eu/shared_public/ddos/arbor.pdf.

* cited by examiner

SYSTEM AND METHOD FOR ITERATIVELY UPDATING NETWORK ATTACK MITIGATION COUNTERMEASURES

FIELD OF THE INVENTION

The disclosed embodiments generally relate to computer network protection, and more particularly, to iterative adjustments to countermeasures configured to mitigate a network attack.

BACKGROUND OF THE INVENTION

Networks are constantly exposed to security exploits that are of significant concern to network providers. For example, Denial of Service ("DoS") attacks can cause significant damage to networks and networked devices. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks).

Other network security threats include Trojan horse attacks that may be embedded in harmless software, viruses that can reproduce themselves and attach to executable files, worms that can spread via stored collections of e-mail addresses, and logic bombs that can remain dormant until triggered by an event (e.g., a date, user action, random trigger, etc.).

Countermeasures can be applied to thwart network security threats. However, when such countermeasures are over aggressive, they can block legitimate network traffic. On the other hand, when such countermeasures are too lenient, security threats can be transmitted with network traffic without being mitigated, posing a security threat to the network. Since network security threats vary with time, countermeasures that are appropriate when first applied can eventually become over aggressive or too lenient.

Such conventional methods and systems have generally been considered satisfactory for their intended purpose. However, there is still a need in the art for updating countermeasures based on real time conditions. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for mitigating a malicious network attack. The method includes receiving an attack alert that a network attack has been detected, saving a sample of captured network traffic in response to the attack alert, playing back the sample while applying a playback countermeasure to the captured network traffic to block sample segments from the sample, analyzing at least one of the blocked sample segments and throughput sample segments that are not blocked, and adjusting the playback countermeasure in response to a result of the analyzing.

In aspects of the disclosure, a computer system is provided for mitigating a malicious network attack. The computer system includes a memory configured to store instructions and a processor disposed in communication with said memory, wherein the processor upon execution of the instructions is configured to receive an attack alert that a network attack has been detected, save a sample of captured network traffic in response to the attack alert, play back the sample while applying a playback countermeasure to the captured network traffic to block sample segments from the sample, analyze at least one of the blocked sample segments and throughput sample segments that are not blocked, and adjust the playback countermeasure in response to a result of the analyzing.

In further aspects of the disclosure, a non-transitory computer-readable storage medium and one or more computer programs embedded therein is provided. The computer programs include instructions, which when executed by the computer system, cause the computer system to receive an attack alert that a network attack has been detected, save a sample of captured network traffic in response to the attack alert, play back the sample while applying a playback countermeasure to the captured network traffic to block sample segments from the sample, analyze at least one of the blocked sample segments and throughput sample segments that are not blocked, and adjust the playback countermeasure in response to a result of the analyzing.

BRIEF DESCRIPTION OF THE DRAWINGS

The accompanying appendices and/or drawings illustrate various non limiting, example, inventive aspects in accordance with the present disclosure.

DETAILED DESCRIPTION OF CERTAIN EMBODIMENTS

Figure 1:
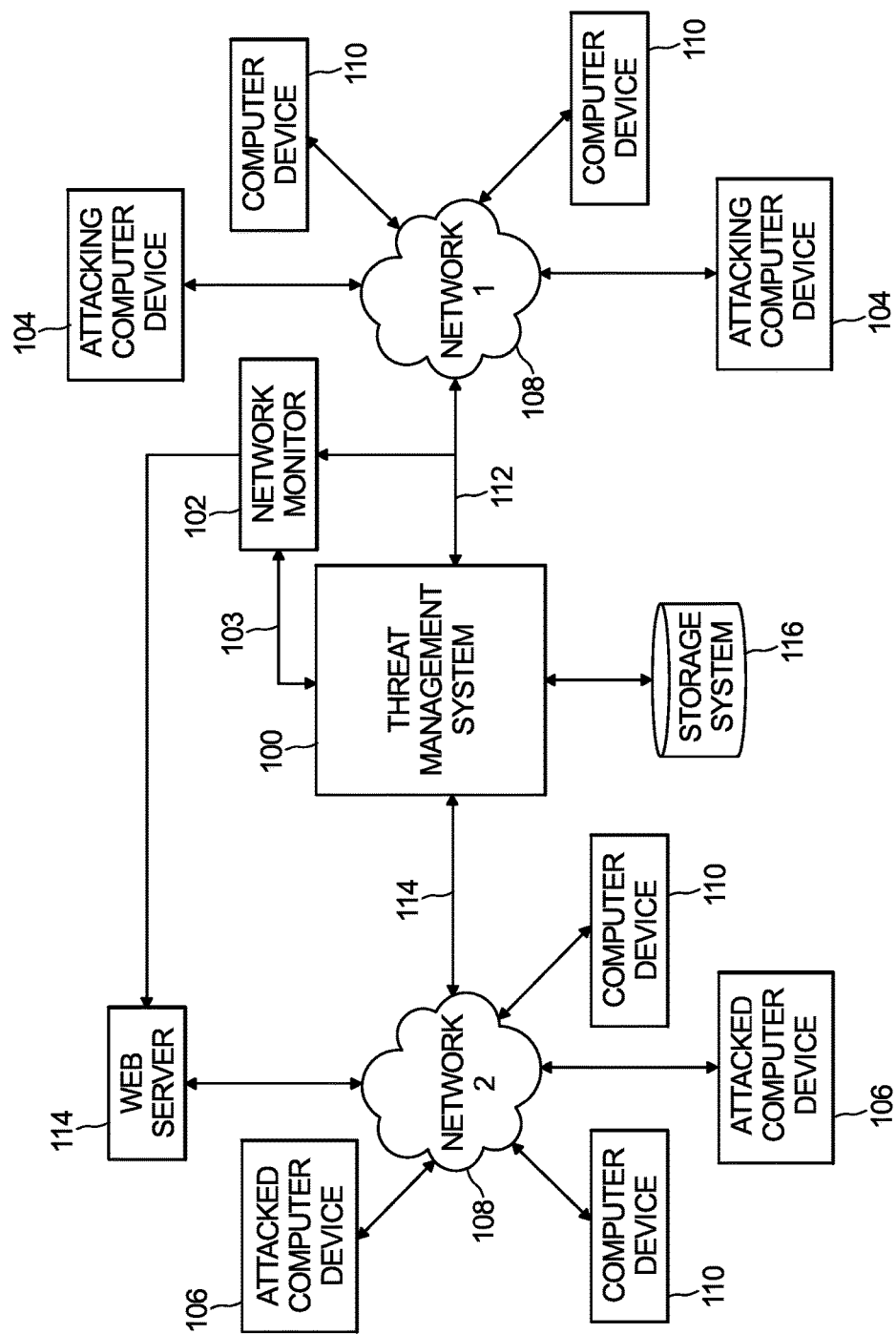
FIG. 1 illustrates a block diagram of an example communication network in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a threat mitigation system (TMS) in accordance with the disclosure is shown in FIG. 1 and is designated generally by reference character 100. Other embodiments of the TMS 100 in accordance with the disclosure, or aspects thereof, are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the TMS 100 is provided that applies mitigation countermeasures to network traffic in order to mitigate a network attack. The TMS 100 receives attack alerts from a network monitor 102 that an attack has been detected in one or more communication between one or more attacking computer devices 104 and one or more attacked computer devices 106. The communication is transmitted via one or more networks 108. The networks 108 support communication by a plurality of computer devices 110 that are not involved in the attack, in other words computer devices 110 that are sending or receiving legitimate network traffic. It is possible for computer devices 110 to be sending both legitimate network traffic and attack traffic, for example in the case where a device has been infected with malware but is still in use by an authorized human user who is using the network normally.

The TMS 100 includes at least one processing device, including a processing device that can perform mitigation countermeasures on network traffic. The TMS 100 may also include hardware and/or software components that are configured to capture network traffic. As described with reference to FIG. 2, TMS 100 is configured to execute software modules 201, and access at least one storage system 116.

Network monitor 102 detects suspicious network activity that indicates an attack is underway. The network monitor 102 sends an attack alert 103 to the TMS 100 when it detects an attack. Network monitor 102 can include passive or active elements that are software and/or hardware components, such as taps, probes, port mirrors. Network monitor 102 can include components that are inline, offline, and/or remote.

Attacking computer devices 104, attacked computer devices 106, and computer devices 110 can be devices such as servers, laptop devices, network elements such as routers, switches, and firewalls, embedded computer devices that are embedded in other devices, such as appliances, tools, vehicles, or consumer electronics, mobile devices, such as laptops, smartphones, cell phones, and tablets.

Networks 108 support communication between computer devices 110 that have access to and authority to use the networks 108. The networks 108 can include one or more networks, such as the Internet or an intranet. In an example, an attack can emanate from a first network 108 (Network 1), such as the Internet, and be configured to attack attacked computer devices 106 that are communicating via a second network 108 (Network 2), such as an intranet. The second network can be, for example, a corporate or organizational network or a country network. In certain scenarios, the second network can be a protected network that the attack attempts to infiltrate. In another example, the first and second networks 108 are both included in one network, such as the Internet.

Depending on the type of attack, a network attack can be instigated and carried on by one or more attacking computer devices 104. These attacking computer devices 104 can work independently from one another or be coordinated, such as in a botnet. For example, some of the attacking computer devices 104 can be zombies or command and control centers. The attacks can target specific or random attacked computer devices 106.

The attack can involve a variety of unwanted network behavior, such as eavesdropping, data modification, identity spoofing, password-based or compromised-key attacks, denial-of-service attacks, man-in-the-middle attacks, sniffer attacks, and application-layer attacks. The attack can be distributed, such as in a Distributed Denial of Service ("DDoS") attack.

Once the TMS 100 is notified that an attack is underway, the TMS 100 operates to mitigate the attack. Mitigation can include filtering out traffic that is associated with the attack. Even while an attack is ongoing, legitimate network traffic can be exchanged by computer devices 110 that are not involved in the attack, as well as by attacking computer devices 104 (zombies) and attacked computer devices 106 that are involved in the attack. Accordingly, an objective of mitigation of the attack is to allow legitimate network traffic, meaning traffic that is not involved in an attack that is being mitigated, to continue to be exchanged, while thwarting the exchange of communication that is involved in the attack.

Communication path 112 represents one or more paths via which network traffic is transmitted, pre-mitigation, from attacking computer devices 104 and computer devices 110. During an ongoing attack, the network traffic transmitted via path 112 (also referred to as pre-mitigation traffic) can include attack traffic and legitimate network traffic. Communication path 114 represents one or more paths via which the network traffic transmitted from attacking computer devices 104 and computer devices 110 is transmitted after mitigation by the TMS 100 (also referred to as mitigated traffic).

As described in greater detail below, upon receipt of an attack alert 103 that an attack is underway, and before performing mitigation, the TMS 100 requests that captured pre-mitigation traffic be stored in sample storage 116. The request can include a request to capture the pre-mitigation traffic, or a request to store pre-mitigation traffic that was already captured, e.g., by the network monitor 102. An external device can respond to the request, or a traffic capture module included with the TMS 100 can perform the capturing of the pre-mitigation traffic, including storing the captured pre-mitigation traffic in at least one storage system 116.

A predetermined amount of pre-mitigation traffic can be captured and stored as a sample. The predetermined amount can be based on, for example, an amount of packets, an amount of bytes, or a time duration during which capture was performed. The sample can be updated or replaced with a new sample upon request, or after a predetermined time interval if the attack is still continuing. The sample can be removed from storage or archived when the attack is terminated.

Furthermore, in response to the attack alert 103, the TMS 100 performs mitigation using initial mitigation countermeasures. In addition, in response to the attack alert 103, the TMS performs a playback process in which playback countermeasures are applied to the sample. Results of the playback process are analyzed to determine if the playback countermeasures mitigate (e.g., block) legitimate network traffic of the sample. If so, the playback countermeasures are adjusted to avoid mitigating the legitimate network traffic. Results of the playback process can also be analyzed to determine if the playback countermeasures are failing to mitigate attack-related network traffic. If so, the playback countermeasures are adjusted to mitigate the attack-related network traffic. The playback process can be repeated iteratively, adjusting the countermeasures at each iteration, until the results of the playback process satisfy a satisfaction criteria.

The mitigation can be performed initially using the initial mitigation countermeasures. The initial mitigation countermeasures used can be same as or different from the initial playback countermeasures used. The mitigation countermeasures can be updated with the adjusted playback countermeasures determined by the playback process. The mitigation using the mitigation countermeasures can be performed iteratively by adjusting the mitigation countermeasures with the playback countermeasures as they are updated (e.g., before the satisfaction criteria have been met). Alternatively, the mitigation countermeasures can be updated with the updated playback countermeasures after the playback process once the satisfaction criteria have been met. It may be required that a secondary satisfaction criteria be satisfied in order to use the updated playback countermeasures as mitigation countermeasures during the iterative process.

In embodiments, the playback countermeasures and the mitigation countermeasures are a set of instructions or configuration to a computer system as shown in operation 408. These instructions may include, but are not limited to, filters that allow or disallow traffic such as, but not limited to, source or destination IP addresses or IP address ranges, network protocol numbers, geographic region associated with the source IP address, or specific content contained within the traffic. In addition to filters, instructions may also include, but are not limited to, restrictions on traffic rates by packet count, byte count, or connection count, restrictions on connection duration, overall traffic rates to or from a computer device 110, or requirement of conformity of a packet stream to a particular network protocol specification.

Applying the playback countermeasures includes analyzing segments of the sample (also referred to as sample segments) according to the countermeasure instructions. The sample segments can be, for example, a packet or a data stream. For example, during playback, the address of each sample segment (e.g., packet) of the sample can be compared to IP addresses or ranges of IP addresses included in the filter entries. As another example, the timestamps and sizes on all packets in a sample segment can be analyzed to determine a traffic rate for each source IP address and compare those rates to the configured maximum allowable rate.

For each comparison, if the comparison satisfies a predetermined condition, the TMS 100 provides a predetermined treatment, which may include blocking the sample segment, meaning it is not output from the TMS 100 as network traffic for transmission to its intended destination as indicated by the sample segment, or forwarding the sample segment, meaning it is output from the TMS 100 as network traffic for transmission to its intended destination as indicated by the sample segment, or blocking the sample segment and blacklisting the source IP address meaning that future traffic from the same source IP address will be blocked.

In an example, the sample segment is a packet. The comparison includes comparing the IP address of the packet to the IP address(es) or IP address range(s) included in the filter entries. The predetermined condition is satisfied when the IP address of the packet is the same as, or is included in, any of the filter entries. The predetermined treatment is to block the packet, causing the packet to be dropped, meaning it is not output from the TMS 100 or stored in memory following application of the filter.

In another example, the sample segment is a series of packets from a given source IP address. The comparison includes comparing the traffic rate to the configured maximum allowable rate. The predetermined condition is satisfied when the rate of the segment exceeds the maximum allowable rate. The predetermined treatment is to block and drop all of the packets. In another example, the sample segment is a packet. The comparison includes comparing the IP address of the packet to the IP address(es) in a whitelist. The predetermined condition is satisfied when the IP address of the packet is included in the whitelist. The predetermined treatment is to forward the packet immediately without further analysis.

Blocked sample segments can be forwarded to an alternate destination, such as a repository, for further analysis. Alternatively, the sample segment is dropped. When the predetermined condition is not satisfied, the traffic segment is output from the TMS 100 to the destination indicated by the traffic segment.

Figure 2:
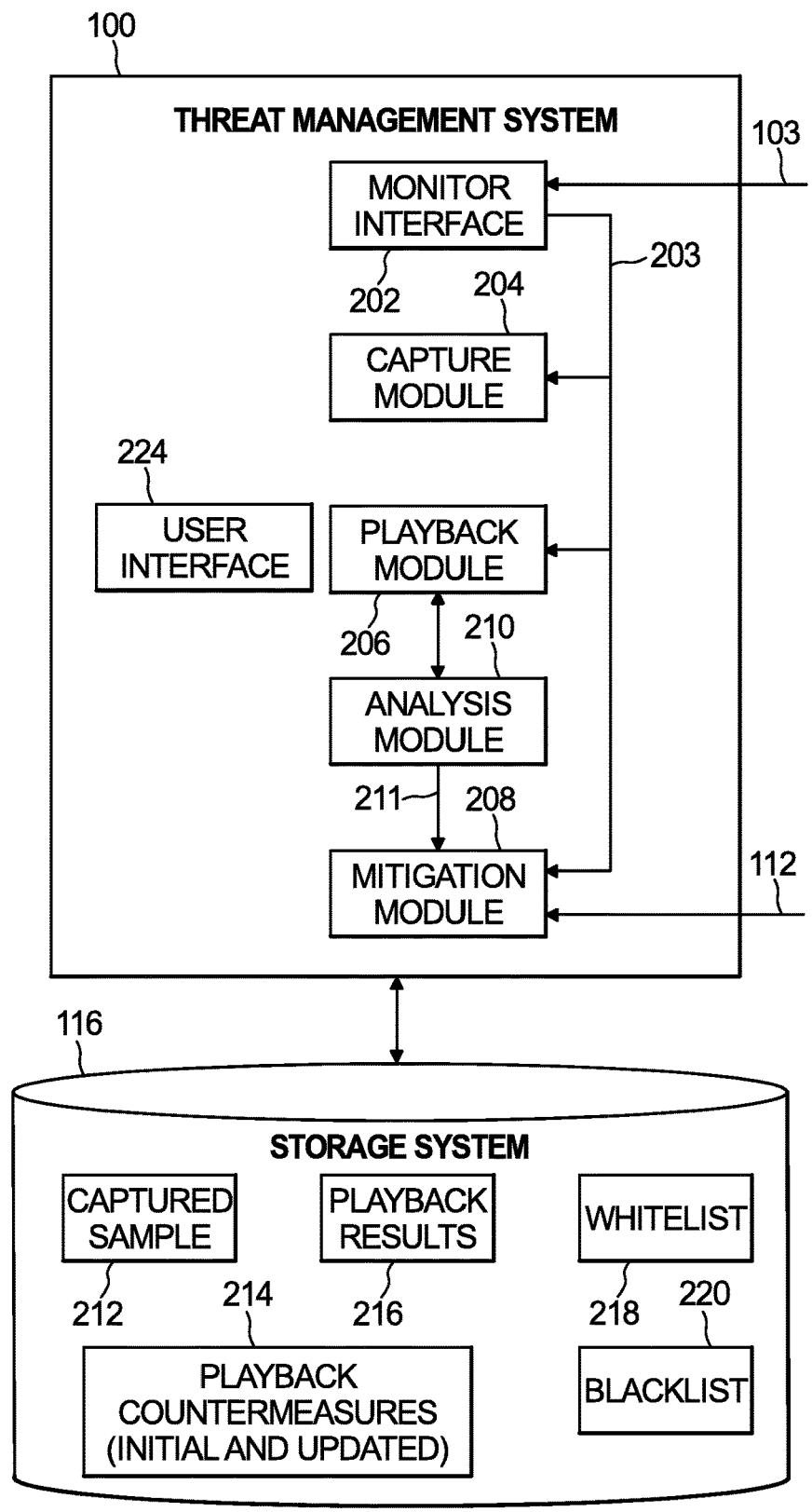
FIG. 2 illustrates block diagram of an example threat management system (TMS) of the communication system shown in FIG. 1 and a storage system accessed by the TMS.

With reference now to FIG. 2, TMS 100 is shown to include a monitor interface 202, a capture module 204, a playback module 206, a mitigation module 208, and an analysis module 210. The monitor interface 202 receives an attack alert 103 from the network monitor 102. In response to receipt of the attack alert 103, the monitor interface 202 can notify the capture module 204, the playback module 206, and the mitigation module 208.

Upon notification from the monitor interface 202, the capture module 204 requests and/or performs capture of a sample of pre-mitigation network traffic. The captured sample is stored in the storage system 116, e.g., in a captured sample module 212. If the attack detected by the network monitor 102 is ongoing a playback process can be repeated after a predetermined time period. Repeating the playback process includes capturing a new sample and storing the new captured sample in captured sample module 212 of storage system 116 to replace the previously stored captured sample. The sample can be captured by the capture module 204 or by an external device, such as network monitor 102 or another device.

Also in receipt of the notification from the monitor interface 202, the playback module 206 performs a playback process using the stored captured sample. The playback process includes applying initial playback countermeasures to the sample. Sample segments blocked (also referred to as blocked playback traffic) by the playback countermeasures can be stored in storage system 116 with the play results 216. Sample segments that were not blocked by the playback countermeasures (also referred to as throughput playback traffic) can also be stored in storage system 116 with the play results 216.

The analysis module 210 analyzes the results of the playback process, namely the blocked playback traffic and/or the throughput playback traffic, to determine if one or more playback criteria are satisfied. The playback criteria can include determining whether the playback countermeasures are filtering out legitimate network traffic and/or failing to filter out attack-related network traffic.

Determining if the blocked playback traffic includes legitimate network traffic can include comparing the blocked playback traffic to a whitelist stored in whitelist storage module 218 of storage system 116. The whitelist can include IP addresses of users that have been verified as being legitimate. If the blocked playback traffic does not include a threshold amount of whitelisted traffic, playback blocking criteria are satisfied, otherwise playback countermeasures are adjusted to block less of the sample. Adjusting the playback countermeasures to block less of the sample can include changing or removing filter entries, raising the maximum allowable traffic rates, changing or removing protocol restrictions, or other changes to the countermeasure instructions in order to filter out less of the sample. The adjusted playback countermeasures are stored as updated playback countermeasures in a playback and mitigation countermeasure storage module 214 of storage system 116.

Determining if the throughput playback traffic includes attack network traffic can include comparing the throughput playback traffic to a blacklist stored in blacklist storage module of storage system 116. The blacklist can include IP addresses of users that have been verified as being associated with a network attack. If the throughput playback traffic does not include a threshold amount of blacklisted traffic, playback blocking criteria are satisfied, otherwise playback countermeasures are adjusted to block more of the sample. Adjusting the playback countermeasures to block more of the sample can include changing or adding filter entries in order to filter out more of the sample. The adjusted playback countermeasures are stored as updated playback countermeasures in playback and mitigation countermeasure storage module 214 in storage system 116.

Entries included in the whitelist and blacklist are not limited to IP addresses. The entries can include other characteristics of network traffic that are verified as being associated with legitimate traffic (regarding the whitelist) or attack traffic (regarding the blacklist) and can be compared to the sample. Examples of other characteristics include, but are not limited to, network protocol numbers, or the presence or absence of given content in the traffic.

The whitelist can be provided by a user, e.g., via a user interface 224 of the TMS or an administrator of web server 114 (shown in FIG. 1). The web server 114 can provide the whitelist as a file or provide updates to the whitelist as a file. Updates to the whitelist can be performed in real time. For example, the web server 114 can update the whitelist with IP addresses associated with users that undergo a verification process as they log onto Network 2. As another example, a network administrator can add to the whitelist a rule that all traffic from an IP address range of a remote datacenter using a particular network protocol should be forwarded so that inter-datacenter traffic is not subject to mitigation.

The blacklist can be provided by a user, e.g., via a user interface 224 of the TMS or an administrator of web server 114 (shown in FIG. 1). The web server 114 can provide the blacklist as a file or provide updates to the blacklist as a file. Updates to the blacklist can be performed in real time. For example, the web server 114 can update the blacklist with IP addresses that have been identified as being associated with an attack, e.g., by repeatedly submitting requests that cause server errors. As another example, a network administrator can add to the blacklist a rule that all traffic sent to a particular IP address should be blocked.

In embodiments, the determination of whether playback criteria are satisfied depends on whether the blocked playback traffic includes entries in the whitelist. In this embodiment, the determination is not concerned with the throughput playback traffic. In embodiments, the determination of whether playback criteria are satisfied depends on whether the throughput playback traffic includes entries in the blacklist. In this embodiment, the determination is not concerned with the blocked playback traffic. In embodiments, the determination of whether playback criteria are satisfied depends on whether the blocked playback traffic includes entries in the whitelist and the throughput playback traffic includes entries in the blacklist. In this embodiment, the determination is concerned with both the blocked playback traffic and the throughput playback traffic.

In embodiments, the whitelist can be used to tag traffic segments in the sample as matching entries in the whitelist. For example, the whitelist tagging can be performed, for example, by the network monitor 102 when it captures the sample. Alternatively, it can be performed by the analysis module, e.g., upon receiving notification 203 that an attack is underway. For example, each packet in the sample having an address that matches a list of verified addresses included in the whitelist is tagged.

In embodiments, the blacklist can be used to tag traffic segments in the sample as matching entries in the blacklist. For example, the blacklist tagging can be performed, for example, by the network monitor 102 when it captures the sample. Alternatively, it can be performed by the analysis module 210, e.g., upon receiving notification 203 that an attack is underway. For example, each packet in the sample having an address that matches a list of addresses from which attack traffic has been sent that is included in the blacklist is tagged.

When the traffic segments of the sample are tagged (whitelist and/or blacklist tagged), the determination whether the playback criteria has been satisfied can be performed quickly, consuming less physical and time resources. This is particularly helpful, since the sample can include a large volume of traffic and the determination can be performed multiple times during an iterative process. When tagging is performed, the tagging is performed once, and the tagged packets are easily distinguishable during the determination whether the playback criteria have been satisfied.

The playback process can be repeated iteratively, updating the playback countermeasures at each iteration as needed, until the analysis module 210 determines that the results of applying the playback countermeasures satisfy the playback satisfaction criteria. In embodiments, a new sample can be captured and the process can be repeated.

Also in receipt of the notification from the monitor interface 202, the mitigation module 208 performs mitigation using initial mitigation countermeasures. The user uses user interface 224 to modify the playback countermeasures until the playback satisfaction criteria are satisfied. In response to the playback satisfaction criteria being satisfied, a notification is sent to the mitigation module 208, which then updates the mitigation countermeasures with the playback countermeasures. The notification can be sent automatically or can be sent by the user via the user interface 224.

Figure 3:
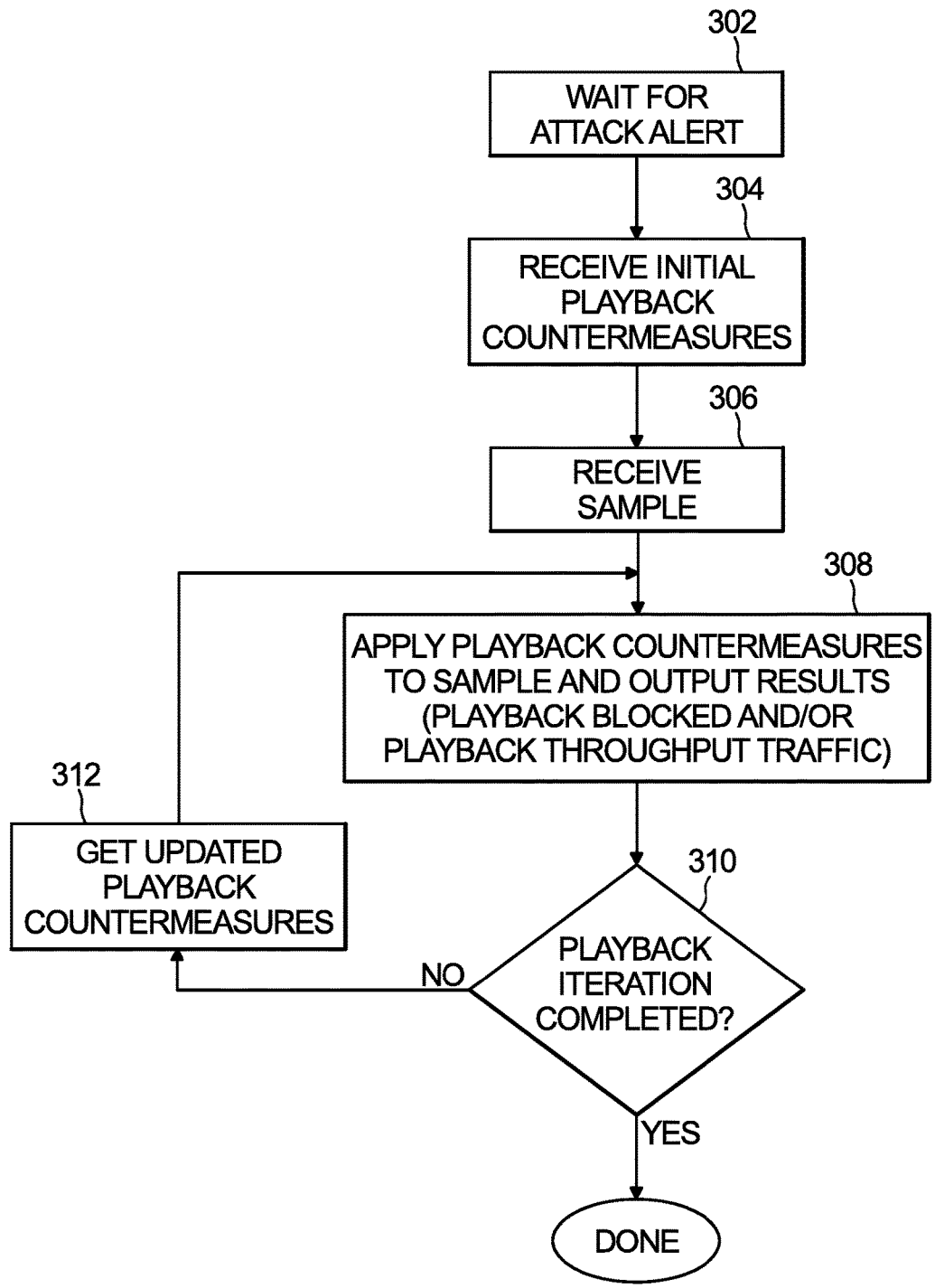
FIG. 3 illustrates an example flowchart showing a method performed by a playback module of the TMS shown in FIG. 2.
Figure 4:
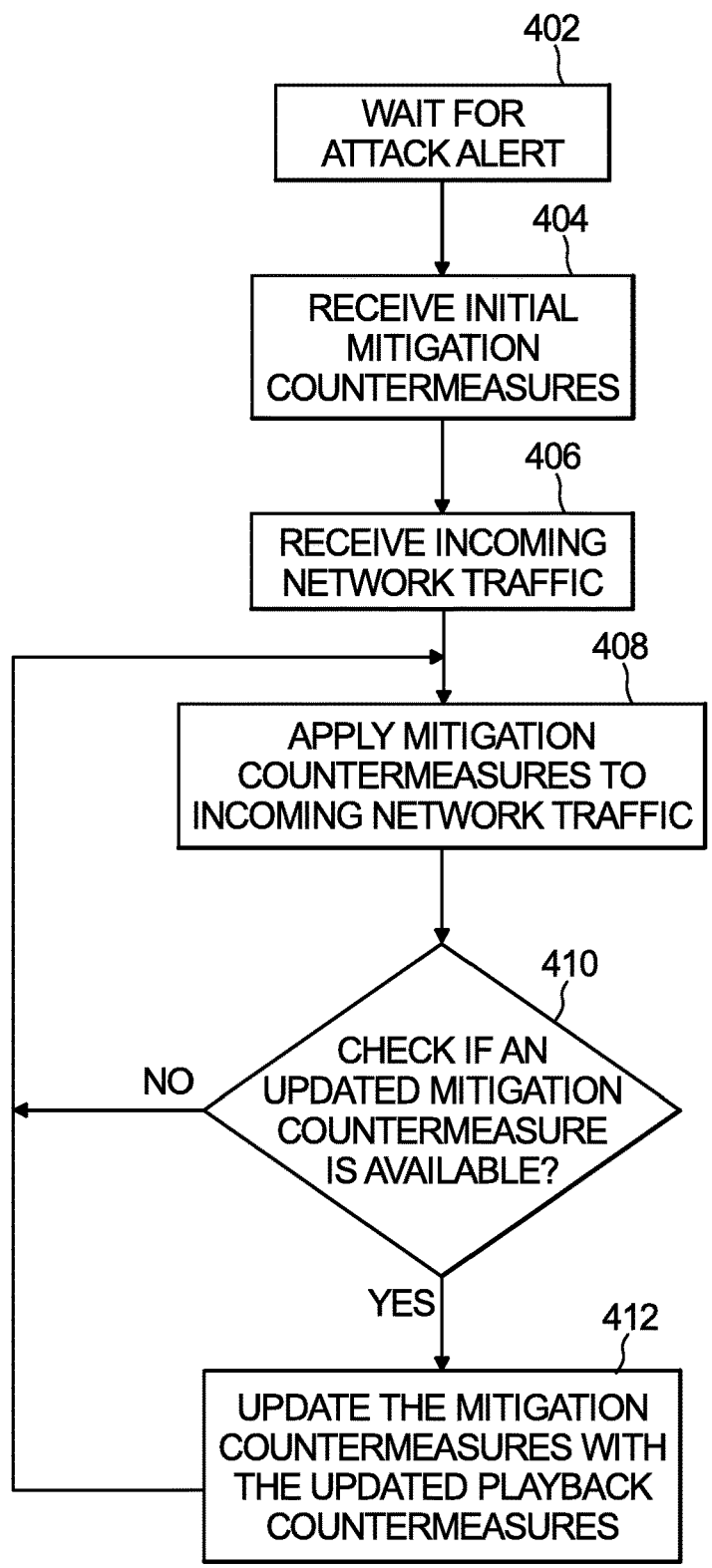
FIG. 4 illustrates an example flowchart showing a method performed by a mitigation module of the TMS shown in FIG. 2.
Figure 5:
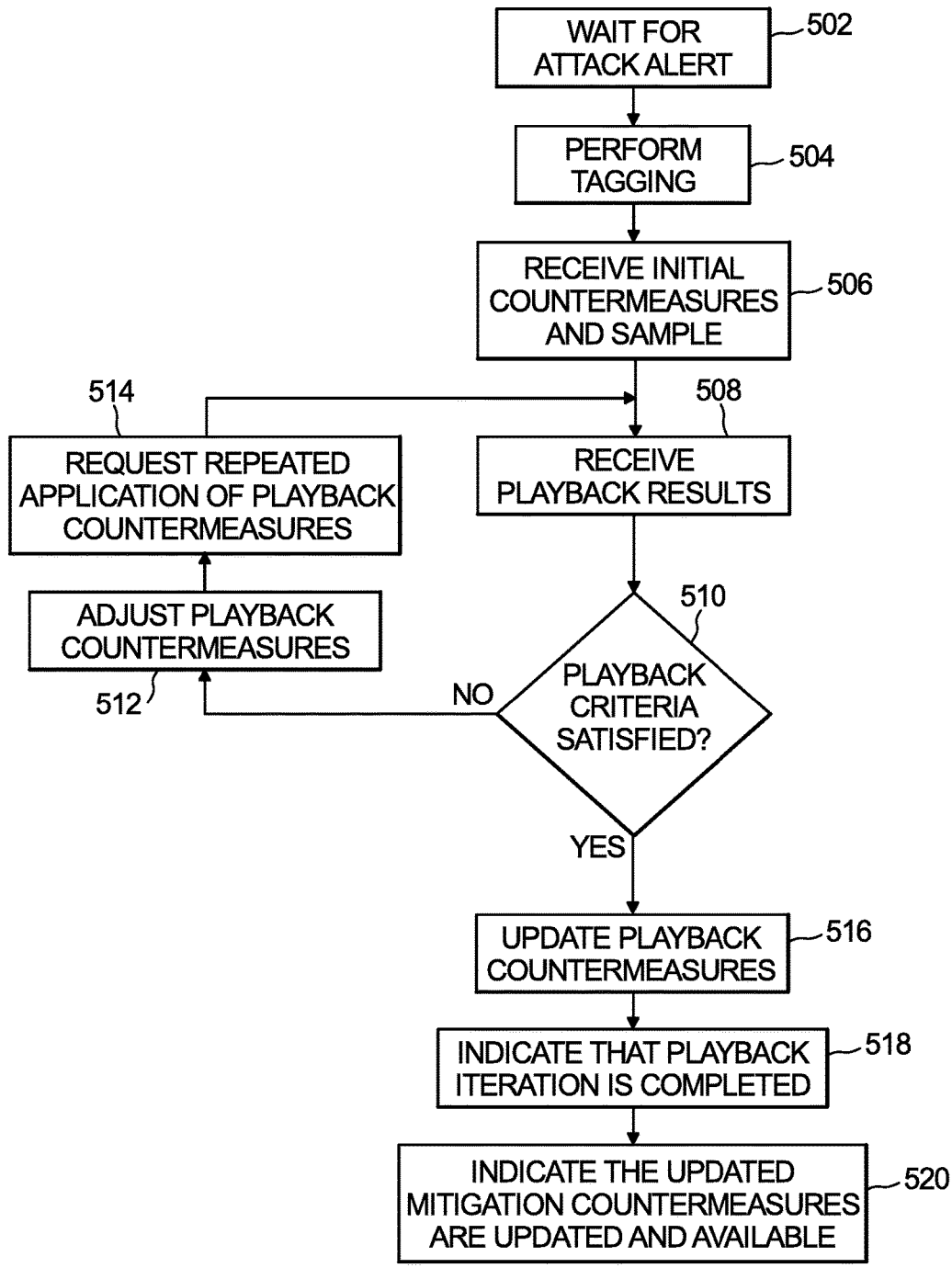
FIG. 5 illustrates an example flowchart showing a method performed by an analysis module of the TMS shown in FIG. 2.

With reference now to FIGS. 3-5, shown are flowcharts demonstrating implementation of the various exemplary embodiments. It is noted that the order of operations shown in FIGS. 3-5 is not required, so in principle, the various operations may be performed out of the illustrated order. Also certain operations may be skipped, different operations may be added or substituted, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 3 shows a flowchart of operations performed by the playback module 206. At operation 302 a wait operation is performed, which includes waiting for notification that an attack has been detected and an attack alert has been transmitted. At operation 304, initial playback countermeasures are received. For example, the initial playback countermeasures can be retrieved from the playback countermeasures storage module 214 of the storage system 116. At operation 306 a sample captured by the capture module 204 is received. For example, the captured sample can be stored in the captured sample storage module 212 of storage system 116.

At operation 308, the playback countermeasures are applied to the sample. The playback results are output. The playback results can include playback blocked traffic and/or playback throughput traffic. At operation 310, a determination is made whether iterations of playback have been completed. An indication of whether playback iterations have been completed is provided by the analysis module 210, based on whether playback criteria have been satisfied yet (for example by a first indication provided at operation 518 of FIG. 5). If the determination at operation 310 is that the playback iteration has not been completed, then at operation 312 updated playback countermeasures are accessed, and the method continues at operation 308 at which the updated playback countermeasures are applied to the sample.

FIG. 4 shows a flowchart of operations performed by the mitigation module 208. At operation 402 a wait operation is performed, which includes waiting for notification that an attack has been detected and an attack alert has been transmitted. At operation 404, initial mitigation countermeasures are received. For example, the initial mitigation countermeasures can be retrieved from the playback and mitigation countermeasures storage module 214 of the storage system 116. At operation 406 network traffic 112 (as shown in FIG. 1) is received.

At operation 408, the mitigation countermeasures are applied to the received network traffic. At operation 410, a determination is made whether an update is available for the mitigation countermeasures. An indication of whether an update is available for the mitigation countermeasures is provided by the analysis module 210, (for example by a second indication provided at operation 520 of FIG. 5). If the determination at operation 410 is that the update is available, then at operation 412, the mitigation countermeasures are updated with the updated playback measures, and the method continues at operation 408 at which the updated mitigation countermeasures are applied. If the determination at operation 410 is that the update is not available, then the method continues at operation 408 in which the mitigation countermeasures are applied to the incoming network without updating them.

FIG. 5 shows a flowchart of operation s performed by the analysis module 210. At operation 502 a wait operation is performed, which includes waiting for notification that an attack has been detected and an attack alert has been transmitted. At operation 504, an optional tagging operation is performed. In embodiments, the sample segments are tagged using a whitelist, which is stored in whitelist storage module 218 of the storage system 116. In embodiments, the sample segments are tagged using a blacklist, which is stored in blacklist storage module 220. If tagging is performed using both the whitelist and the blacklist, then different tags are used to indicate whether they are tagged based on the whitelist or the blacklist. At operation 506, initial playback countermeasures and the captured sample are received. For example, the initial playback countermeasures can be retrieved from the playback and mitigation countermeasures storage module 214 of the storage system 116.

At operation 508, playback results associated with a first iteration are received. For example, the playback results can be retrieved from the playback results storage module 216 of the storage system 116. At operation 510, the playback results are analyzed to determine if playback criteria are satisfied. In embodiments the analysis can include determining if the blocked playback traffic includes legitimate network traffic, for example by comparing the blocked playback traffic to a whitelist. In embodiments the analysis can include determining if the throughput playback traffic includes attack network traffic, for example by comparing the throughput playback traffic to a blacklist. The determination whether the playback blocking criteria are satisfied can be based on whether the blocked playback traffic does not include a threshold amount of whitelisted traffic, and/or the throughput playback traffic does not include a threshold amount of blacklisted traffic.

If the determination at operation 510 is that the playback criteria is not satisfied, then at operation 512 the playback countermeasures are adjusted. In embodiments, when it is determined at operation 510 that the blocked playback traffic does include a threshold amount of whitelisted traffic, the playback countermeasures can be adjusted to block less of the sample, such as by changing or removing filter entries of the playback countermeasure in order to filter out less of the sample. In embodiments, when it is determined at operation 510 that the throughput playback traffic does include a threshold amount of blacklisted traffic, the playback countermeasures can be adjusted to block more of the sample, such as by changing or adding filter entries in order to filter out more of the sample. In an example, the adjusted playback countermeasures can be stored as updated playback countermeasures in playback and mitigation countermeasure storage module 214 in storage system 116.

At operation 514, the playback module 206 is requested to repeat application of playback countermeasures using the updated playback countermeasures, after which the method continues at operation 508 in which the results from the present iteration of operation 514 are received.

At operation 516, if the determination at operation 510 was that the playback criteria were satisfied, then the playback countermeasures, e.g., the playback and mitigation countermeasures are updated. The method continues at operation 518, at which a first indication is provided to the playback module 206 that the playback is completed. This first indication is processed by the playback module at operation 310 shown in FIG. 3. At operation 520, a second indication is provided to the mitigation module 208 that mitigation countermeasures are updated and available. This second indication is processed by the mitigation module 410 shown in FIG. 4. The indications can be provided by sending a message, setting a flag, or using another technique known to one skilled in the art.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the TMS 100 may be implemented or executed by one or more computer systems. For example, TMS 100 can be implemented using a computer system such as example computer system 602 illustrated in FIG. 6. In various embodiments, computer system 602 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Figure 6:
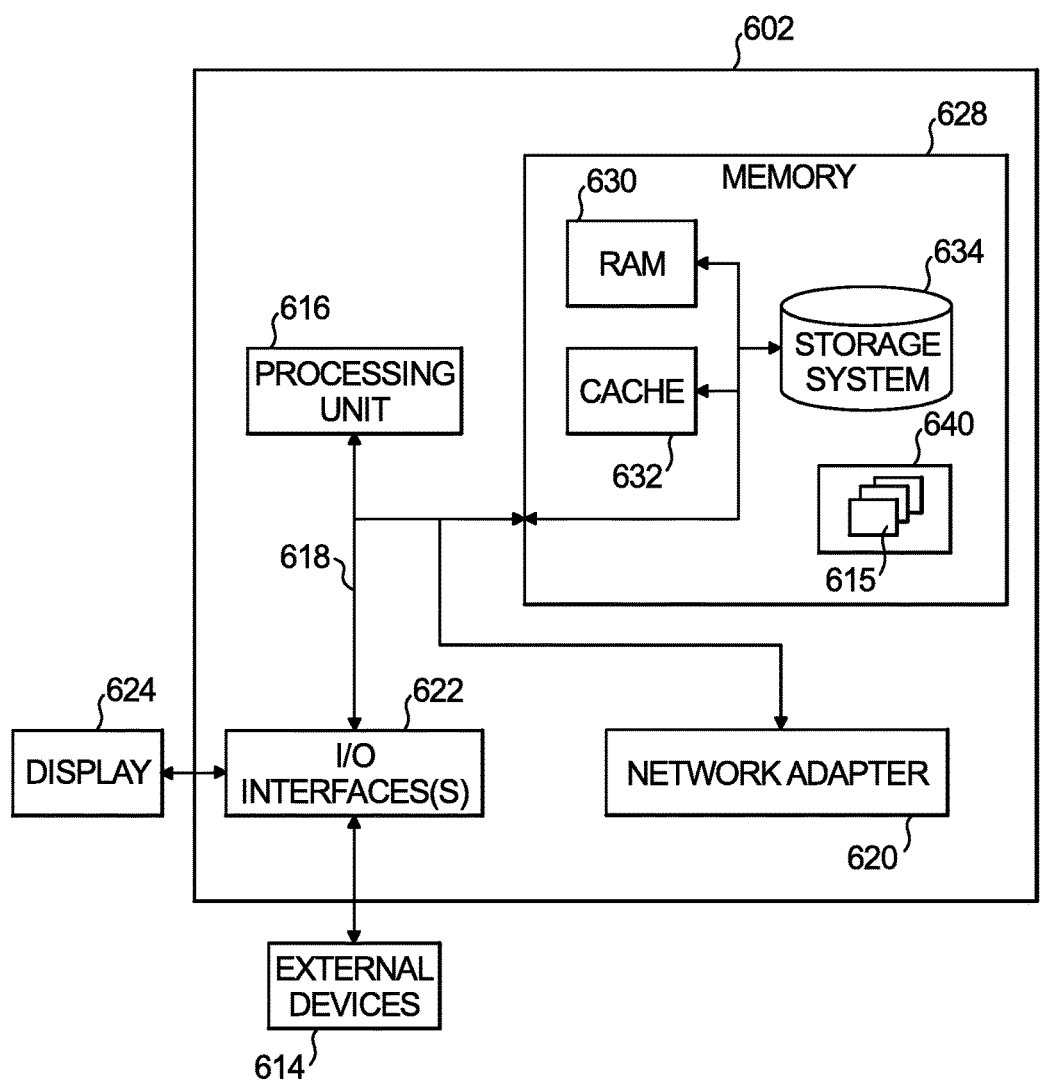
FIG. 6 illustrates an example computing system that could be used to implement the TMS of FIG. 1.

Computer system 602 is shown in FIG. 6 in the form of a general-purpose computer device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by computer system 602, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615, such as computer system 602, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keyboard, a pointing device, a display 624, etc.; one or more other devices that enable a user to interact with computer system 602; and/or any devices (e.g., network card, modem, etc.) that enable TMS 100 to communicate with one or more other computer devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of network management server 104 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the TMS 100 include the ability to update, in real time, mitigation countermeasures based on iterative update of playback countermeasures used during playback of a sample. Tagging packets in the sample based on a whitelist allows for simple detection of tagged packets in blocked traffic, which indicates that playback countermeasures need to be adjusted to block less traffic. Similarly, tagging packets in the sample based on a blacklist allows for simple detection of tagged packets in throughput traffic, which indicates that the countermeasures need to be adjusted to block additional traffic. Since the whitelist used to tag the packets is updated in real time by a webserver that has up-to-date information about authorized users and the IP addresses they are using, the tagging process further aides in providing an accurate, real time method of accurately updating the playback countermeasures.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to mitigate a malicious network attack, the method comprising:
   receiving an attack alert that a network attack has been detected;
   saving a sample of captured network traffic in response to the attack alert;
   playing back the sample while applying a playback countermeasure to the captured network traffic to block sample segments from the sample;
   analyzing at least one of the blocked sample segments and throughput sample segments that are not blocked; and
   adjusting the playback countermeasure in response to a result of the analyzing.

2. The method of claim 1, further comprising applying the adjusted playback countermeasure as mitigation countermeasures to network traffic in real-time.

3. The method of claim 1, wherein the attack alert is received in real-time.

4. The method of claim 1, further comprising requesting capture of the sample in response to the attack alert.

5. The method of claim 1, wherein the network attack is a DDOS attack.

6. The method of claim 1, wherein the playback countermeasure includes at least one filter, and adjusting the playback countermeasure includes at least one of adding and removing an element of the filter that blocks traffic.

7. The method of claim 1, further comprising:
monitoring the network traffic in real-time to detect an attack; and
sending the attack alert in real-time in response to detection of an attack.

8. The method of claim 1, wherein analyzing the removed packets includes detecting tagged packets, the tagged packets being tagged to indicate that the packet has characteristics verified as being at least one of legitimate network traffic and attack network traffic.

9. The method of claim 8, further comprising:
accessing a whitelist that includes one or more entries that are verified as being associated with legitimate network traffic;
receiving updates to the whitelist in real time; and
tagging packets of the sample that match any of the entries in the whitelist.

10. A computer system for mitigating a malicious network attack, comprising:
a memory configured to store instructions;
a processor disposed in communication with said memory, wherein said processor upon execution of the instructions is configured to:
receive an attack alert that a network attack has been detected;
save a sample of captured network traffic in response to the attack alert;
play back the sample while applying a playback countermeasure to the captured network traffic to block sample segments from the sample;
analyze at least one of the blocked sample segments and throughput sample segments that are not blocked; and
adjust the playback countermeasure in response to a result of the analyzing.

11. The computer system of claim 10, wherein the processor, upon execution of the instructions, is further configured to apply the adjusted playback countermeasure as mitigation countermeasures to network traffic in real-time.

12. The computer system of claim 10, wherein the attack alert is received in real-time.

13. The computer system of claim 10, wherein the processor, upon execution of the instructions, is further configured to request capture of the sample in response to the attack alert.

14. The computer system of claim 10, wherein the playback countermeasure includes at least one filter, and adjusting the playback countermeasure includes at least one of adding and removing an element of the filter that blocks traffic.

15. The computer system of claim 10, wherein the processor, upon execution of the instructions, is further configured to:
monitor the network traffic in real-time to detect an attack; and
send the attack alert in real-time in response to detection of an attack.

16. The computer system of claim 10, wherein analyzing the removed packets includes detecting tagged packets, the tagged packets being tagged to indicate that the packet has characteristics verified as being at least one of legitimate network traffic and attack network traffic.

17. The computer system of claim 10, wherein the processor, upon execution of the instructions, is further configured to:
access a whitelist that includes one or more entries that are verified as being associated with legitimate network traffic;
receive updates to the whitelist in real time; and
tag packets of the sample that match any of the entries in the whitelist.

18. A non-transitory computer readable storage medium and one or more computer programs embedded therein, the computer programs comprising instructions, which when executed by a computer system, cause the computer system to:
receive an attack alert that a network attack has been detected;
save a sample of captured network traffic in response to the attack alert;
play back the sample while applying a playback countermeasure to the captured network traffic to block sample segments from the sample;
analyze at least one of the blocked sample segments and throughput sample segments that are not blocked; and
adjust the playback countermeasure in response to a result of the analyzing.

19. The computer readable storage medium of claim 18, wherein the computer system, when executing the computer programs, is caused to apply the adjusted playback countermeasure as mitigation countermeasures to network traffic in real-time.

20. The computer readable storage medium of claim 18, wherein the computer system, when executing the computer programs, is caused to:
access a whitelist that includes one or more entries that are verified as being associated with legitimate network traffic;
receive updates to the whitelist in real time; and
tag packets of the sample that match any of the entries in the whitelist.

* * * * *